US011935285B1

(12) United States Patent
Cao et al.

(10) Patent No.: US 11,935,285 B1
(45) Date of Patent: Mar. 19, 2024

(54) REAL-TIME SYNTHETIC OUT OF FOCUS HIGHLIGHT RENDERING

(71) Applicant: Apple Inc., Cupertino, CA (US)

(72) Inventors: Frederic Cao, Santa Clara, CA (US); Philip G. Lee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1291 days.

(21) Appl. No.: 15/995,909

(22) Filed: Jun. 1, 2018

Related U.S. Application Data

(60) Provisional application No. 62/514,580, filed on Jun. 2, 2017.

(51) Int. Cl.
*G06V 20/10* (2022.01)
*G06T 5/20* (2006.01)
*G06T 5/50* (2006.01)
*G06T 5/00* (2006.01)

(52) U.S. Cl.
CPC .............. *G06V 20/10* (2022.01); *G06T 5/20* (2013.01); *G06T 5/50* (2013.01); *G06T 5/73* (2024.01); *G06T 5/92* (2024.01); *G06T 2207/10024* (2013.01); *G06T 2207/20201* (2013.01); *G06T 2207/20208* (2013.01)

(58) Field of Classification Search
CPC ..... G06K 9/00664; G06T 5/003; G06T 5/009; G06T 5/20; G06T 5/50; G06T 2207/20208; G06T 2207/20201; G06T 2207/10024
See application file for complete search history.

(56) References Cited

U.S. PATENT DOCUMENTS

| 5,048,109 A | 9/1991 | Bloomberg |
| 8,429,173 B1 | 4/2013 | Rosenberg |
| 8,861,884 B1 | 10/2014 | Fang |
| 9,094,609 B2 | 7/2015 | Kim |

(Continued)

FOREIGN PATENT DOCUMENTS

JP H06231273 A 8/1994

OTHER PUBLICATIONS

Ramakrishnan, Harish Narayanan, "Detection and estimation of image blur," Masters Thesis, Missouri University of Science and Technology, Fall 2010.

*Primary Examiner* — Nancy Bitar
(74) *Attorney, Agent, or Firm* — Blank Rome LLP (57) ABSTRACT

This disclosure relates to techniques for synthesizing out of focus highlighting effects in images in real-time. Digital single-lens reflex (DSLR) cameras and other cameras having wide aperture lenses typically capture images with a shallow depth of field (SDOF). So-called SDOF photography may be particularly fit for portrait photography, since it nicely emphasizes the subject, while essentially deemphasizing the background via blurring. Simulating this kind of blurring, particularly around background light sources, using a comparatively larger depth of field (LDOF) camera, may require a high dynamic range (HDR) image capture system, to accurately determine the color of background light sources, which are prone to saturation. However, small form-factor cameras having smaller lens apertures may not have the bandwidth or processing power to process full HDR images in real time. Thus, described herein are techniques to synthesize color accurate, out-of-focus background highlight regions in real-time for images captured by LDOF cameras.

17 Claims, 10 Drawing Sheets

(56) References Cited

U.S. PATENT DOCUMENTS

| | | |
|---|---|---|
| 9,171,352 B1 | 10/2015 | Raynaud |
| 9,349,165 B2 | 5/2016 | Cho |
| 2006/0187308 A1* | 8/2006 | Lim .................. H04N 5/23248 |
| | | 348/208.4 |
| 2007/0189748 A1 | 8/2007 | Drimbarean |
| 2010/0123807 A1* | 5/2010 | Lee .......................... G06T 5/50 |
| | | 348/241 |
| 2012/0063697 A1 | 3/2012 | Han |
| 2013/0208093 A1 | 8/2013 | Sun |
| 2013/0243330 A1 | 9/2013 | Chiu |
| 2013/0308005 A1* | 11/2013 | Takahashi ................. G06T 7/60 |
| | | 348/222.1 |
| 2014/0218550 A1 | 8/2014 | Chuang |
| 2014/0347350 A1* | 11/2014 | Tseng ....................... G06T 7/55 |
| | | 345/419 |
| 2015/0002545 A1 | 1/2015 | Webster |
| 2015/0043808 A1 | 2/2015 | Takahashi |
| 2015/0054986 A1 | 2/2015 | Tanaka |
| 2015/0062384 A1 | 3/2015 | Tanaka |
| 2015/0110404 A1* | 4/2015 | Cho ........................ G06T 5/003 |
| | | 382/195 |
| 2015/0172547 A1 | 6/2015 | Wang |
| 2015/0294523 A1 | 10/2015 | Smith |
| 2016/0048952 A1 | 2/2016 | Tezaur |
| 2018/0350043 A1 | 12/2018 | Seely |
| 2019/0362199 A1 | 11/2019 | Lin |
| 2020/0082535 A1 | 3/2020 | Lindskog |

\* cited by examiner

REAL-TIME SYNTHETIC OUT OF FOCUS HIGHLIGHT RENDERING

TECHNICAL FIELD

This disclosure relates generally to the field of digital imaging. More particularly, but not by way of limitation, it relates to techniques for synthesizing out of focus highlighting effects (also known as "bokeh") in images in real-time.

BACKGROUND

In camera imaging, multiple factors, such as the size of the lens aperture, may influence the depth of field of an image. Large digital single-lens reflex (DSLR) cameras and cameras having wide aperture lenses can be used to capture images with a relatively shallow depth of field (SDOF), meaning that the range of scene depths for which objects in the captured image will appear sharp (i.e., in focus) is very small compared to images captured under other conditions (e.g., with a narrower aperture). While the limited range of in-focus regions of a SDOF image may seem to be a physical limitation, it has been turned into an aesthetic advantage by photographers for over a century. For example, so-called SDOF photography may be particularly fit for portrait photography, since it nicely emphasizes the subject (who is typically brought into the camera's focus range), while essentially deemphasizing the background (e.g., by making the background appear blurry and/or out of focus), which may otherwise be of little interest in the scene.

In such SDOF images, background light sources (also referred to herein as "highlight regions" or "background highlights") may appear as large, blurred colored discs. When captured from a distance, each background light source may appear very small—but also very bright—and may only occupy a small portion of the field of view. When going through a lens, the light rays from such light sources will converge, almost cross at the correct focus plane position, and then diverge. The total light energy contained in the cone will remain essentially constant for every position of the imaging plane, and will be distributed onto the image sensor, depending on the focus position.

If the camera focuses on the light source (which is common for cameras that have a small lens aperture size and/or do not have a shallow depth of field), then the whole energy of the light source may be concentrated onto just a few pixels on the sensor. On the contrary, if the light source is out of focus (which is common for cameras that have a shallow depth of field), the same energy may be spread over a much larger surface area, and each pixel may receive a lesser amount of energy than when the light source is in focus.

In the case that the light source is perfectly in focus, the light source may be powerful enough to saturate the image sensor pixels it hits (i.e., causing the sensor to record its maximum signal value at one or more pixels). In such a case, the light source will appear white (i.e., if all color channels on the sensor are saturated) or near-white (i.e., if one or more color channels on the sensor are saturated), with a small spatial extent. On the contrary, if the light source is out of focus, its energy will be spread across more pixels, and each pixel may receive energy below its saturation level. Because the pixels do not saturate, they can also render the correct color of the light source.

In some instances, it may be desirable to artificially simulate this kind of out-of-focus blur around background light sources (also known as "bokeh") in instances where the camera captures images with a larger depth of field than is desired. For example, certain smaller form factor cameras (such as those used in mobile phones) may have smaller apertures compared to DSLR cameras, and thus may capture images having a larger depth of field. When simulating an out-of-focus blur for background light sources the original image may need a certain amount of dynamic range in order to accurately determine the color of such background light sources. In other words, if the original image has saturated (i.e., "clipped" or "blown out") light sources, the resulting blur would not accurately represent the true color (or intensity) of the light sources in the scene, since most of the energy incoming on the sensor would be lost due to the pixels' saturation. Since each saturated pixel records much less energy than what really hit it, any applied digital blur would spread this already smaller amount of energy out even further, thus resulting in a blurred "bokeh" disc that is colorless and much darker than it should be.

The advent of mobile, multifunction devices, such as smartphones and tablet devices, has resulted in a need for high-resolution, high dynamic range ("HDR"), and small form factor cameras, capable of generating high levels of image quality in real time, for integration into such mobile, multifunction devices. Increasingly, as users rely on these multifunction devices as their primary cameras for day-to-day use, users demand features, e.g., portrait photography, which they have become accustomed to using in dedicated-purpose camera bodies. Thus, what is needed are techniques to synthesize SDOF effects, e.g., color-accurate, out-of-focus background highlight renderings, in real-time for images captured cameras with a relatively larger depth of field, such as small form-factor cameras having smaller lens apertures.

SUMMARY

Camera devices, computer readable storage media, and related methods are disclosed herein that are configured to synthesize color-accurate, out-of-focus background highlight rendering in real-time for images captured by large depth of field ("LDOF") cameras, such as small form-factor cameras having smaller lens apertures. This synthetic rendering may be used to approximate an image captured with a SDOF. It should be appreciated that any description of creating/synthesizing/rendering a SDOF or out-of-focus effect from a LDOF image (or image captured from a LDOF camera) is meant to capture a relative change in the depth of field of the image (i.e., the image has a first "large" depth of field when captured that is synthetically reduced to a smaller "shallow" depth of field) and not to imply any particular ranges of depth of field.

According to some embodiments disclosed herein, the camera may utilize one (or more) image sensors to capture a high resolution image, as well as corresponding depth information data for the captured scene that may indicate the portions of the image that are in the scene's background and/or foreground (e.g., by using a secondary stereo camera and/or other types of depth sensors). According to some such embodiments, after capturing the high resolution image, the camera may also capture a smaller resolution image (referred to hereinafter as a "thumbnail" or "thumbnail image"). The integration time for the capture of the thumbnail image may be set to a shorter time duration than the regular integration time of the high resolution image capture, such that highlights within the scene, i.e., bright regions in the scene, do not saturate or "clip" in the thumbnail image, thus allowing such highlight regions in the thumbnail image to be captured with closer to their true color values in the scene. Once obtained, the high resolution image and the smaller resolution may be compared, so as to identify corresponding background highlight regions in the two images, and then the background highlight regions of the high resolution image may be blurred using color and brightness information obtained from the corresponding regions of the smaller resolution image.

Because the resolution of a thumbnail image is typically much smaller than the resolution of an original high resolution image, the two images may not be directly merged, i.e., on a one-to-one or pixel-to-pixel basis, when the color and brightness information from the thumbnail image is used to generate realistic synthetic SDOF effects in the background of the high resolution image, e.g., blurred discs with at least one of a color characteristic and a brightness characteristic of the disc based on the color and brightness information obtained from the thumbnail image. However, the inventors have discovered that high resolution imaging is not required for the synthesis of realistic SDOF effects, e.g., bokeh effects. Indeed, the resolution of a thumbnail image (e.g., an image that is 160 pixels by 120 pixels or 144 pixels by 108 pixels) is typically sufficient to provide enough color and brightness information to accurately blur and apply realistic SDOF effects to the corresponding portions of the original high resolution image (i.e., in the event that the original high resolution has clipped highlight regions). For example, in embodiments wherein the intent of the photographer is to simulate a very large defocus blur, the effective output image resolution in the blurred region is actually quite small, so the thumbnail image's resolution may be sufficient to provide the necessary image information for the simulated SDOF effects in the background portions of the high resolution image. The resolution for the image may, for instance, be defined by the spatial frequency at which the modulation transfer function (MTF) reaches a value of 50%. The maximal reproducible spatial frequency is 0.5 cycles/pixel (also known as the Nyquist frequency). If the image is very blurry, the resolution may be a small fraction of Nyquist frequency. For instance, if the resolution is 0.05 cycles/pixel, this means that a thumbnail obtained by downsizing the image by a factor 10 essentially contains the same information as the original image.

Moreover, because the resulting image is a very blurred (and, therefore, effectively low resolution) simulated SDOF image, the inventors have further discovered that the thumbnail image does not need to be precisely registered with the high resolution image, either. In fact, if the synthetic defocus blur is large enough, blurring the clipped image is largely independent from the highlight regions. For example, if the highlight region is a small light source, then most of its energy is likely to be lost by signal clipping (e.g., if the depth of field is large). When the synthetic blur is applied to such a light source, the clipped energy may be diffused over an area that is relatively large, but every pixel in that area will receive only a very small portion of the original light source's energy, i.e., because of clipping. As a consequence, the clipped light source in such scenarios may be largely invisible in the final synthesized image after the blurring operation has been applied. Therefore, the thumbnail image may be used to separately generate more color- and/or brightness-accurate blurred highlight regions (e.g., colored bokeh discs) that may simply be added to the background of the synthesized high resolution blurred image.

According to some embodiments, special care may be taken when adding the synthesized blurred background portions to the original high resolution image, such that the resultant synthesized image maintains a natural SDOF look. For example, the blurred background discs (or other synthesized background elements to simulate SDOF effects) may be configured such that they do not occlude, i.e., block, an object that is in the foreground of the scene (and likely in sharp focus), as that would potentially result in an unnatural looking synthesized SDOF image.

Further advantages of the techniques disclosed herein include the fact that there is no requirement to capture and/or compute two (or more) high resolution images and merge them together (i.e., to get the added color information that typically may only be provided by high resolution HDR image capture). In some embodiments, the techniques described herein will cause an image sensor to run at a larger 'effective' frame rate (i.e., to read out the high resolution image and the thumbnail image for each captured 'instance' of the scene). However, because the thumbnail image may be captured at such a low resolution (and, preferably, with a lower integration time), the techniques described herein to perform synthetic SDOF effects may also be done on captured video in "real time," thus allowing a live video stream preview of synthetic SDOF images on a device's display—and also potentially video recording with synthetic SDOF effects.

Thus, according to some embodiments, a non-transitory program storage device is disclosed. The program storage device is readable by a programmable control device. Instructions are stored on the program storage device for causing the programmable control device to: obtain a first image of a scene; obtain a second image of the scene; identify a highlight region in the first image, the highlight region having a corresponding region in the second image; modify the first image by applying a blur to the highlight region of the first image, wherein one or more characteristics of the blur is determined using information obtained from the corresponding region in the second image; and store the modified first image in a memory.

Other embodiments of non-transitory program storage devices are also disclosed. In one such embodiment, instructions are stored on the program storage device for causing a programmable control device to: obtain the second image of the scene having a lower resolution than the first image of the scene. In another such embodiment, instructions are stored on the program storage device for causing a programmable control device to: obtain the second image of the scene with a lower integration time than the first image of the scene.

In another embodiment, the first image and the second image represent the scene at the same moment in time. In yet another embodiment, the first image and the second image represent the scene at different moments in time. In still other embodiments, one or more depth sensors may be used to identify background portions of the scene, e.g., so that only highlight regions in a background portion of the scene (i.e., and not highlights in a foreground portion of the scene) are modified to generate synthetic SDOF effects.

In another embodiment, instructions are stored on the program storage device for causing a programmable control device to: create a downscaled version of the first image, wherein the downscaled version of the first image has the same resolution as the second image; and compare the downscaled version of the first image to the second image.

In still other embodiments, instructions are stored on the program storage device for causing a programmable control device to: create a disc for each of one or more highlight regions in the first image; and add each of the created discs to one or more identified background portions of the first image at a position corresponding to the respective highlight region for which the disc was created. In other such embodiments, at least one of: a color characteristic of the disc and a brightness characteristic of the disc may be based, at least in part, on the information obtained from the corresponding region in the second image.

Various methods of synthesizing color-accurate, out-of-focus background highlight rendering in real-time for images captured by LDOF cameras are also disclosed herein, in accordance with the program storage device embodiments enumerated above.

Various electronic imaging devices are also disclosed herein, in accordance with the program storage device embodiments enumerated above. Such electronic devices may include one or more optical sensors/camera units; a programmable control device; and a memory coupled to the programmable control device. Instructions are stored in the memory, the instructions causing the programmable control device to perform techniques in accordance with the program storage device embodiments enumerated above.

DETAILED DESCRIPTION

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Figure 1A:
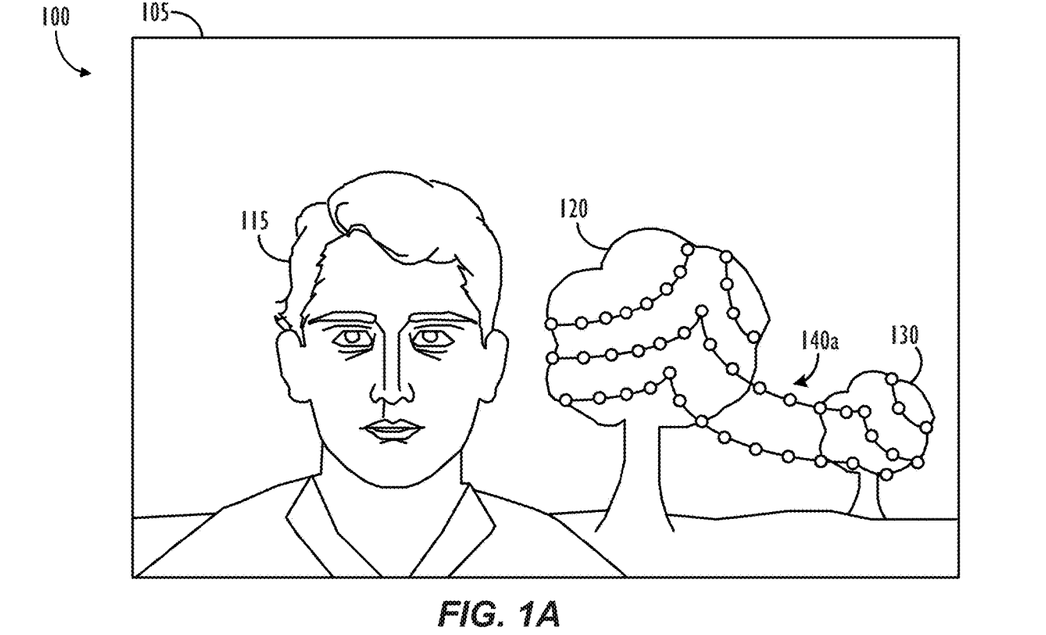
FIG. 1A is a sample image of a scene to which synthetic SDOF effects are desired to be applied.

Turning now to FIG. 1A, a sample image 100 of a scene 105 to which synthetic SDOF effects are desired to be applied is shown. The scene 105 comprises human subject 115 in the foreground of scene 105, as well as several elements in the background of scene 105, e.g.: trees 120 and 130, and individual point light sources 140a (e.g., LED tree-style lights). The background of scene 105 in image 100 is shown as largely white (i.e., with no gray overlay), indicating that the background is largely in focus in image 100. As described above, very bright light sources in images captured by small form factor cameras having relatively long integration times tend to be largely in focus, but run a risk of fully saturating the corresponding pixels on the camera's image sensor (thus, appearing as pure white in the image 100, even if such light sources actually had a distinct color in scene 105).

Figure 1B:
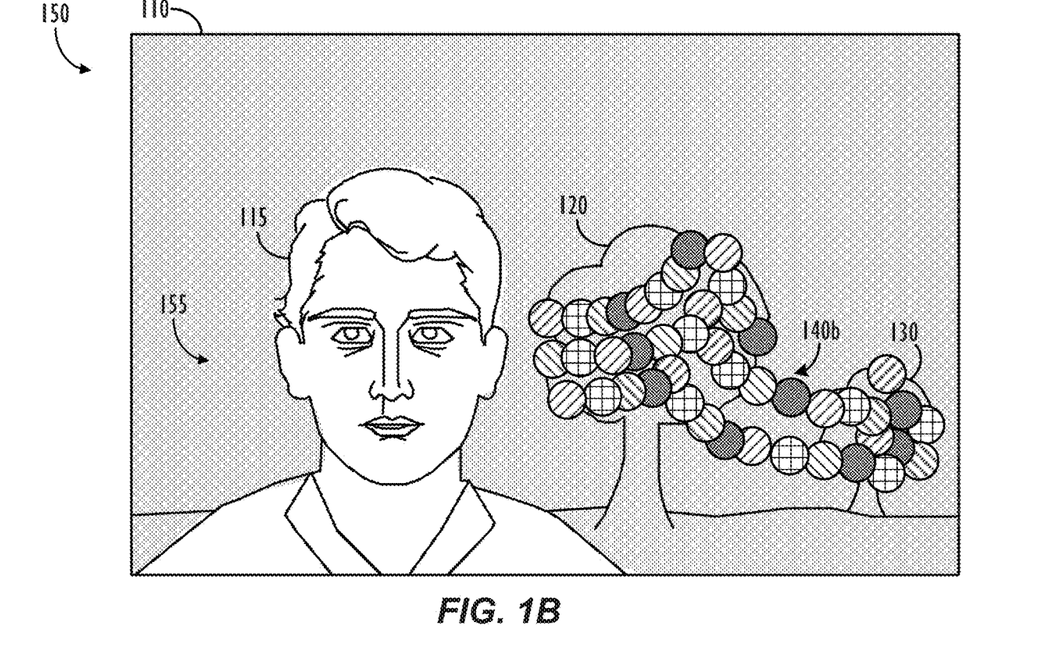
FIG. 1B is a sample image of a scene to which synthetic SDOF effects have been applied, according to one or more embodiments.

Turning now to FIG. 1B, a sample image 150 of scene 110 to which synthetic SDOF effects have been applied is shown, according to one or more embodiments. As compared to image 100 in FIG. 1A, the background of scene 110 in image 150 in FIG. 1B is shown as largely having a gray overlay, indicating that the background is blurred (or otherwise made to appear out of focus) in image 150. Moreover, the elements of scene 110 indicated above in the description of FIG. 1A as being bright enough that they saturated the corresponding pixels on the camera's image sensor (i.e., individual point light sources 140a) have been replaced by stylized versions of enlarged bokeh discs, see, e.g., the representation of individual point light sources 140b in FIG. 1B. The various shading patterns on the point light sources in FIG. 1B represent the fact that the original coloration of the objects in scene 110 (as opposed to the saturated, pure-white values captured in the corresponding objects in scene 105 of image 100) has been preserved in the synthesized bokeh discs in image 150 to which the synthetic SDOF effects have been applied. For example, a square cross-hatching pattern may represent a yellow-colored disc, whereas a diagonal pattern going up and to the right may represent a red-colored disc, a diagonal pattern going up and to the left may represent a green-colored disc, and the darkly-shaded pattern may represent a blue-colored disc, and so forth. The techniques for producing the synthetic SDOF effects illustrated in image 150 of FIG. 1B will now be described in further detail.

Figure 2A:
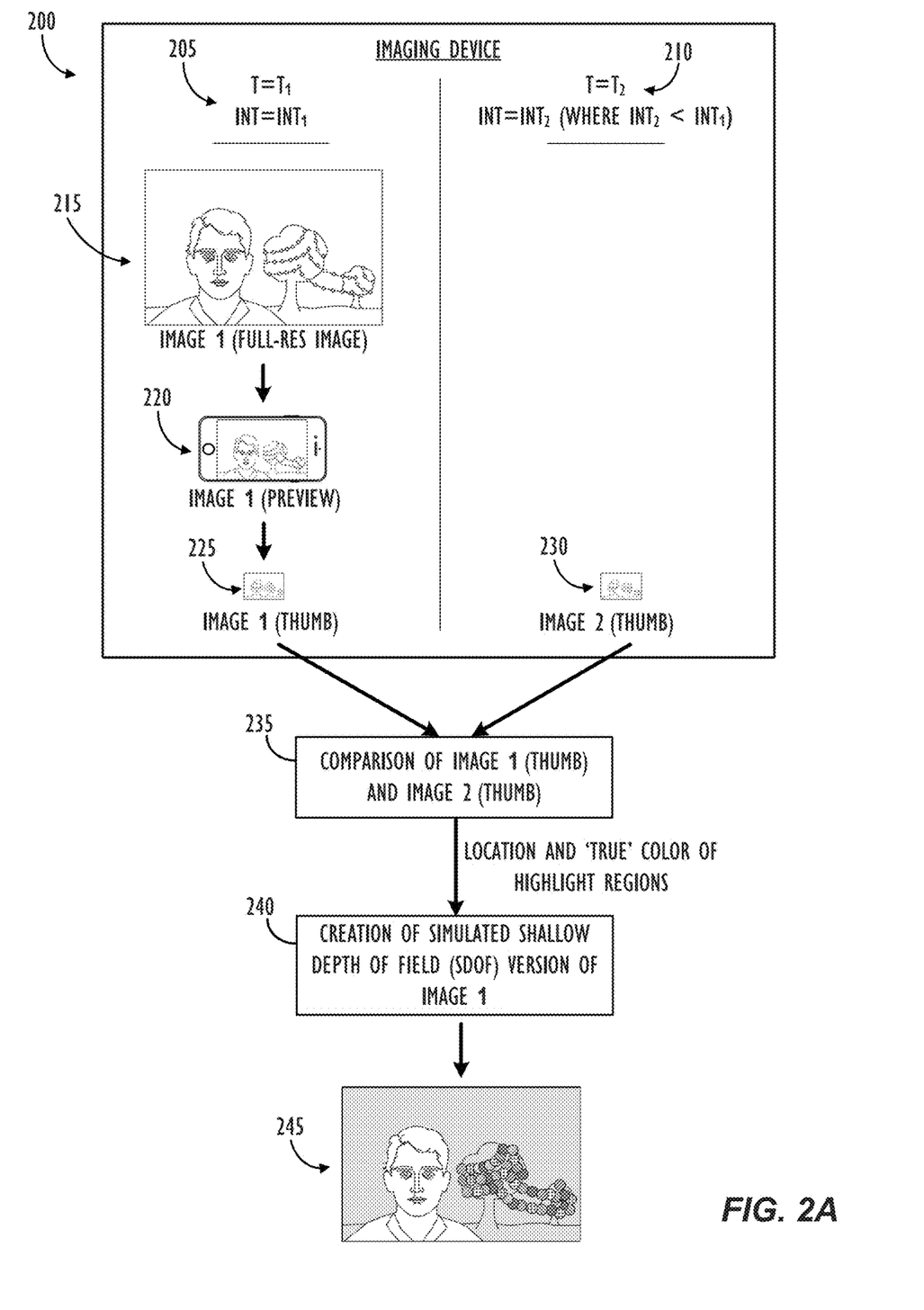
FIG. 2A is a flowchart illustrating a technique for synthesizing SDOF effects using two captured images of a scene, according to one or more embodiments.

Turning now to FIG. 2A, a flowchart illustrating a technique for synthesizing SDOF effects using two captured images of a scene is shown, according to one or more embodiments. First, an imaging device 200 may take a first image of a scene ("Image 1") with image capture parameters 205, e.g., a first capture time, $T_1$, and a first integration time, $INT_1$. According to some embodiments, the imaging device 200 may also store a full resolution version of Image 1 (215) to memory, e.g., if the user of the imaging device indicates a desire to capture a particular moment of the scene and store it to memory. The full resolution image size of the imaging device may, e.g., be 8 Megapixels, 12 Megapixels, 16

Megapixels, or greater. According to some embodiments, the imaging device 200 may also display a preview version of Image 1 (220) to the device's display screen, e.g., to provide visual feedback to a user while the user is panning over or previewing a scene. The preview image size of the imaging device may be any suitable size as desired for the preview image, e.g., 1440 pixels by 1080 pixels (i.e., "1080p") to give the equivalent of a "High Definition" (HD) preview image to the user of the imaging device. Finally, according to some embodiments, the imaging device 200 may also provide a thumbnail version of Image 1 (225), e.g., directly from the image sensor hardware package, that is an even smaller resolution, such as 144 pixels by 108 pixels, or one-tenth the size of the preview image.

Once the first image, Image 1, has been captured, imaging device 200 may further capture a second image of a scene ("Image 2") with image capture parameters 210, e.g., a second capture time, $T_2$, and a second integration time, $INT_2$. In other imaging devices, Image 2 may be captured concurrently with Image 1, e.g., using a second image sensor of the imaging device. For reasons which will be described further herein, the integration time of the second image, $INT_2$, may intentionally be set to a smaller value than the integration time of the first image, $INT_1$.

A common way to increase the dynamic range of a camera is to capture bracketed images, that is, a burst of two (or more) images with different integration times. Long integration times are used to capture shadows in the image with a good signal-to-noise ratio, while short integration times are used to preserves highlights in the image (i.e., while avoiding clipping or saturation of the pixels in those regions). To render a high dynamic range scene, then, the different captures need to be merged together and tone mapped to fit the dynamic range of the display device and the output color space. Because this requires the imaging device to process images at larger frame rate, exposure bracketing high dynamic range solutions currently do not work at real time video framerates (e.g., 30 frames per second, or fps). However, HDR techniques are also sensitive to scene motion and can result in ghosting artifacts, since the two (or more) images that are merged to create the final HDR image may be taken at slightly different moments in time. One benefit of using a shorter integration time for Image 2 is that pixels corresponding to bright highlight regions in the scene will be less likely to become saturated, i.e., "clipped" or "blown out" in Image 2 than they are in Image 1, meaning that more accurate color information may be obtained from those portions of the scene from the (intentionally) 'under-exposed' Image 2.

According to some embodiments, only a thumbnail version of Image 2 (230) may need to be captured for the purposes of synthesizing real time SDOF effects in a captured image. The size of the thumbnail version of Image 2 (230) may be determined based on the needs of a given implementation, but, generally, smaller resolutions will lead to faster processing times. The lower limit on the resolution of the thumbnail versions of Image 2 (230) may be set at the threshold where details that are important for viewing are still recoverable from the background. For example, if a background point light source is only 3 pixels wide in the full resolution version of the scene, creating a thumbnail image that is downscaled by a factor of 10 from the full resolution version of the image may cause the point light source to become effectively imperceptible (other than via its contribution to neighboring pixels) in the thumbnail version of the scene, which may be undesirable. Whereas, if the smallest background point light source that is of interest to recover is 20 pixels wide in the full resolution version of the scene, creating a thumbnail image that is downscaled by a factor of 10 from the full resolution version of the image will still allow the point light source to be recovered from the thumbnail version of the scene, albeit with a reduced width of 2 (i.e., 20/10) pixels. Thus, according to some embodiments, a thumbnail version of Image 2 may be created that is 1/10 the dimensions of the full resolution image. In other embodiments, the thumbnail version of Image 2 may be set at some fixed percentage, e.g., 25%, of the total size of the full resolution image. In other embodiments, depending on device processing power, the thumbnail version of Image 2 may even have the same resolution as the full resolution version of Image 1, allowing a true pixel-to-pixel HDR comparison between the two images.

Next, at block 235, a comparison may be made between the thumbnail version of Image 1 (225) and the thumbnail version of Image 2 (230). [It should be noted that, conversely, in other embodiments, the thumbnail version of Image 2 may be upscaled to the full resolution of Image 1 and then compared at the full resolution scale. However, the more processing that may done at low resolutions may lead to greater performance optimizations in the overall image processing pipeline.] This comparison may be used to locate and determine the 'true' color of the background highlight regions of the full resolution version of Image 1 (215). According to some embodiments, the difference between Image 1 and Image 2 at all corresponding pixel positions may be calculated in order to determine where the likely background highlight regions are located within the scene. For example, in background regions of the scene where there is no bright point light source, the difference between the two thumbnails at those locations may be zero (or less than some threshold difference value), so even if those regions of Image 2 were to be blurred and added to the background of Image 1, it would not add a significant amount of "new" color information, and thus would have no appreciable effect on the final synthesized SDOF image. For regions where the difference between the corresponding pixels in Image 1 and Image 2 is above a threshold value (i.e., indicating a bright light source in Image 1), appropriately colored blurred discs of an appropriate size may be created (pulling the accurate color information from the under-exposed Image 2 and pulling the corresponding scene depth information from Image 1, or wherever the scene depth information is stored), and then upscaled (if necessary) and added to the background of Image 1 at the appropriate locations in the final synthesized SDOF image. The size of the blurred disc may be customized for a given implementation. If depth information is available, the laws of optics may be used to determine the appropriate size of the disc. The shape of the disc may also be customized for a given implementation. For example, some implementations may try to change the shape of the blurring kernel to, e.g., squares, diamonds, crosses, etc. According to other embodiments, if the threshold difference is not met between the corresponding pixels of Image 1 and Image 2, i.e., the difference between Image 1 and Image 2 in a given region is small or negligible, then the background blurring may be performed directly on the background pixels of Image 1, as any modifications to the final synthesized SDOF image due to contributions from the 'true' color or brightness information gathered from Image 2 would barely be visible.

Next, at block 240, the simulated SDOF version of Image 1 may be created, using the aforementioned information gathered from the comparison of the thumbnail version of Image 1 (225) and the thumbnail version of Image 2 (230), such as the location and true color of background highlight regions. Because the effective resolution in the blurred background of the synthesized SDOF image is smaller than the full resolution, the location and 'true' color information regarding the background highlight regions that were obtained in block 235 may simply be ported over to the full resolution version of Image 1 and applied in the scene background, as shown in exemplary image 245. As may be understood, the synthesized SDOF effects determined using the information obtained from the thumbnail comparison of block 235 may also be applied at any other desired resolution, e.g., the preview version resolution (220). Image 245 reflects the fact that the background of the image has been blurred (i.e., grayed out) and bokeh discs of the appropriate size and color (i.e., the pattern-filled circles) have been synthesized at the locations of the background highlight regions in the captured scene.

Figure 2B:
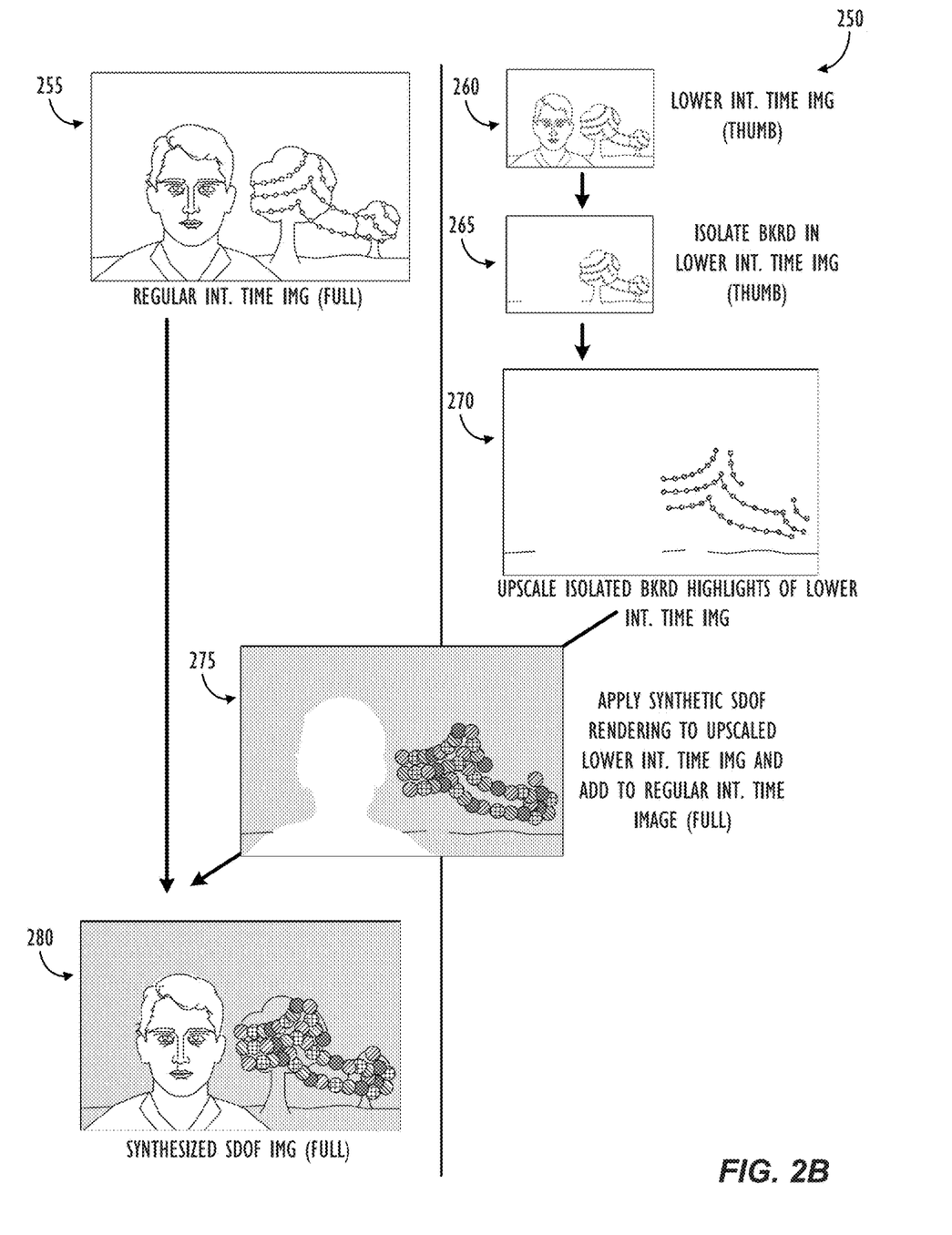
FIG. 2B is a flowchart, graphically illustrating a technique for synthesizing SDOF effects before merging two captured images of a scene, according to one or more embodiments.

Turning now to FIG. 2B, a flowchart 250, graphically illustrating a technique for synthesizing SDOF effects before merging two captured images of a scene, is shown, according to one or more embodiments. First, a full-resolution 'regular integration time' image (255) and a lower-resolution 'lower integration time' image (260) are obtained by an imaging device. In this example, processing is performed on the lower-resolution 'lower integration time' image (260) to synthesize accurate SDOF effects before the background of the scene from the lower-resolution 'lower integration time' image (260) is upscaled (if necessary) and merged into the background of full-resolution 'regular integration time' image (255). According to some embodiments, scene depth information may be obtained during the capture of either the full-resolution 'regular integration time' image (255) and/or the lower-resolution 'lower integration time' image (260). This scene depth information may be utilized to isolate the background in the lower-resolution 'lower integration time' image (260), as is shown in 'lower integration time' image background 265. Because the foreground in a SDOF image usually comprises the subject of interest in the scene, i.e., the object that is desired to be in focus, the synthesized SDOF effects (e.g., blurring and/or bokeh disc creation) may be applied only to the background portions of the scene. While a blurring operation may be applied to all background pixels, the creation of colored bokeh discs may be reserved only for those portions of the background wherein the difference between the lower-resolution 'lower integration time' image (260) and the corresponding pixels in the full-resolution 'regular integration time' image (255) is above some threshold value, e.g., at the location of background highlight regions. As shown in image 270, the 'lower integration time' image background 265 may be upscaled (if necessary), so that it is at the same resolution as the full-resolution 'regular integration time' image (255) to which it is going to be added. According to some embodiments, the image 270 may also be "thresholded," such that only the highlight regions in the background are present (as shown, e.g., by the removal of trees 120 and 130 in image 270, since the trees are not highlight regions). Next, the aforementioned synthesized SDOF effects (e.g., blurring and/or bokeh disc creation) may be applied to the upscaled, isolated background portions of the lower-resolution 'lower integration time' image (270), resulting in image 275. Finally, the synthetic SDOF background created in image 275 may be used to replace the background pixels of the full-resolution 'regular integration time' image (255), resulting in final synthesized SDOF image 280. As mentioned previously, because the background portions are blurred, if there is not a perfect registration (i.e., alignment), or if there are minor subject matter differences between the background pixels in the full-resolution 'regular integration time' image (255) and the lower-resolution 'lower integration time' image (260), it will not likely be particularly noticeable in the final synthesized SDOF image 280.

Figure 2C:
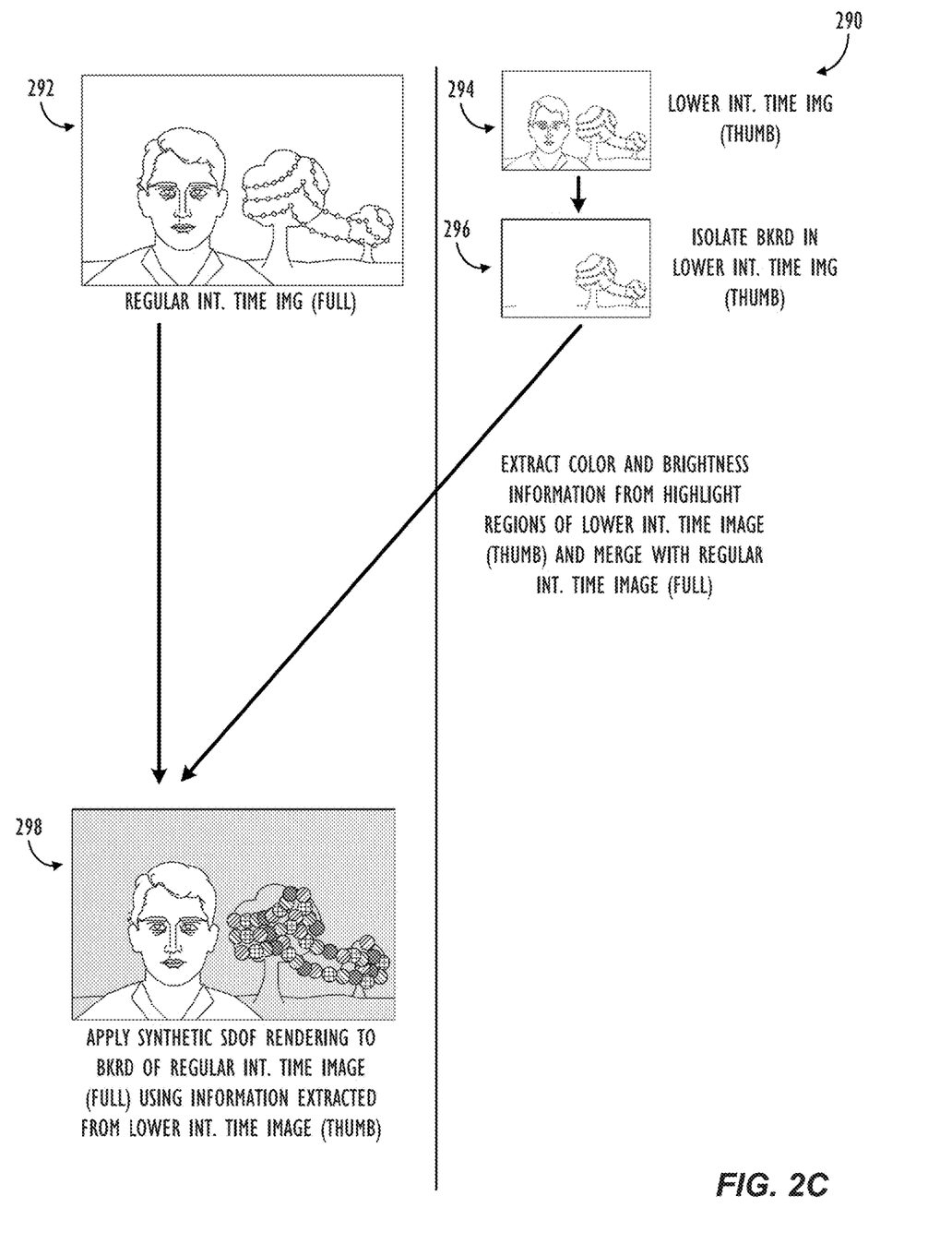
FIG. 2C is a flowchart, graphically illustrating a technique for synthesizing SDOF effects after merging two captured images of a scene, according to one or more embodiments.

Turning now to FIG. 2C, a flowchart 290, graphically illustrating a technique for synthesizing SDOF effects after merging two captured images of a scene, is shown, according to one or more embodiments. First, a full-resolution 'regular integration time' image (292) and a lower-resolution 'lower integration time' image (294) may again be obtained by an imaging device. In this example, processing is performed directly on the full-resolution 'regular integration time' image (292) to synthesize accurate SDOF effects after the background of the scene from the lower-resolution 'lower integration time' image (294) is upscaled (if necessary) and merged into the background of full-resolution 'regular integration time' image (292). According to some embodiments, scene depth information may be obtained during the capture of either the full-resolution 'regular integration time' image (292) and/or the lower-resolution 'lower integration time' image (294) (or within a threshold amount of time from the capture of images 292 or 294). This scene depth information may be utilized to isolate the background in the lower-resolution 'lower integration time' image (294), as is shown in 'lower integration time' image background 296. The 'true' color and brightness information corresponding to background highlight regions in image 296 may then be extracted and merged with the full-resolution 'regular integration time' image (292). In other words, the synthetic SDOF effects may be applied directly to the background pixels of the full-resolution 'regular integration time' image (292), using the additional 'true' color and brightness information extracted from the 'lower integration time' image background (296), where necessary. In particular, in background regions where there is not a background highlight identified (e.g., based on the comparison of corresponding regions in the 'regular integration time' and 'lower integration time' images of the scene), the pixels of the full-resolution 'regular integration time' image (292) may be blurred using a standard blurring algorithm (as opposed to generating a more computationally-expensive bokeh disc blur); whereas, in background regions where there is a background highlight identified, a blurred bokeh disc of the appropriate size and brightness may be synthesized, using the additional (i.e., non-saturated) color and brightness information extracted from the corresponding regions of the 'lower integration time' background image (296). The resulting synthesized SDOF image is shown as image 298 in FIG. 2C. As may now be appreciated, final synthesized SDOF image 280 in FIG. 2B and synthesized SDOF image 298 in FIG. 2C reach an equivalent synthesized SDOF result image, despite following different paths of incorporating the additional information gathered from the 'lower integration time' image into the synthesized SDOF result image.

Figure 3A:
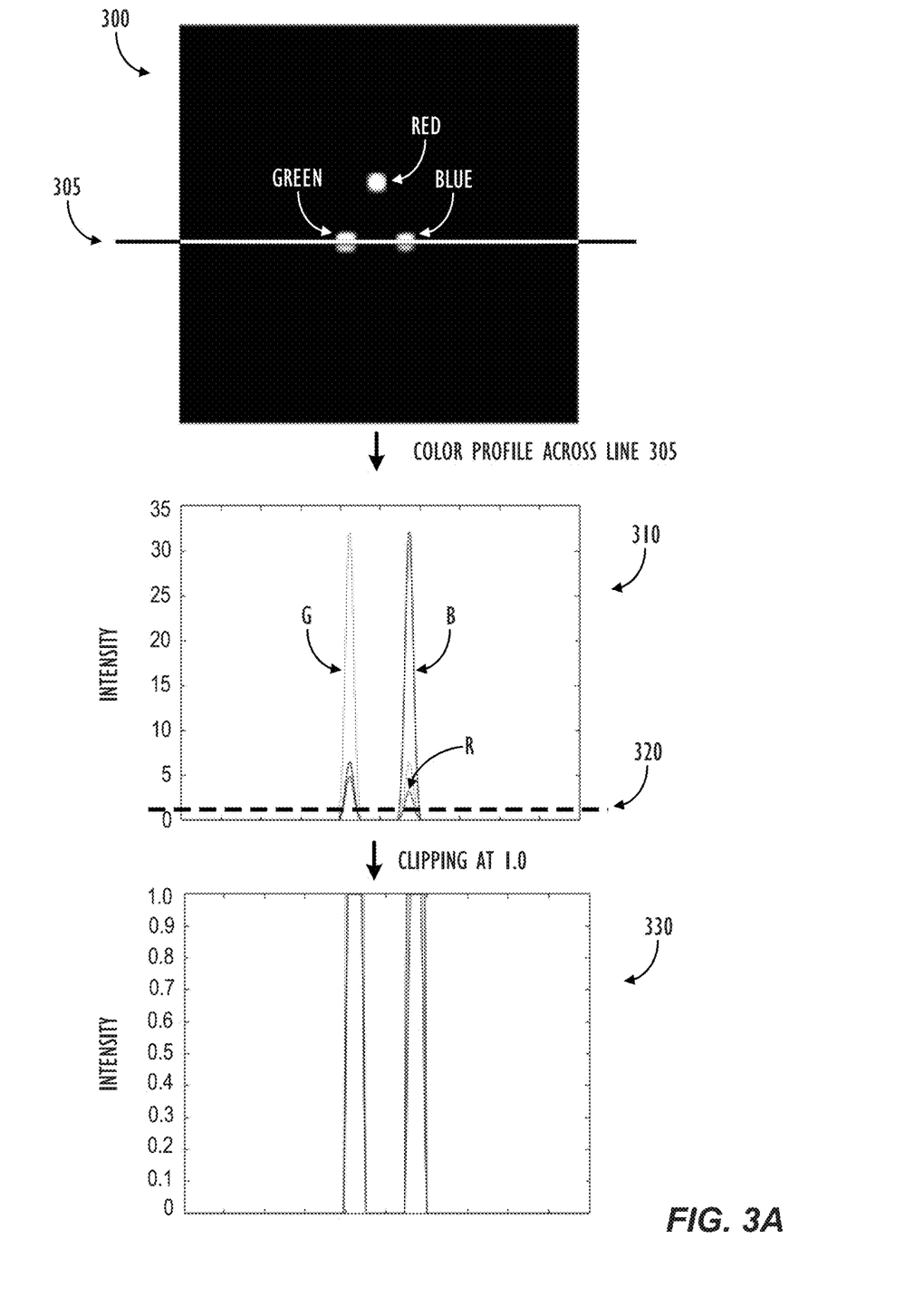
FIG. 3A illustrates three simulated light sources that have been clipped by an image sensor and the corresponding color channel profiles.

Turning now to FIG. 3A, three simulated light sources that have been clipped by an image sensor (and their corresponding color channel profiles) are illustrated. As mentioned above, image 300 illustrates three simulated light sources: a red light at the top of the triangle of light sources; a green light at the bottom left of the triangle of light sources; and a blue light at the bottom right of the triangle of light sources. The simulation shows the light sources as being slightly blurred before being captured by a sensor. The interiors of the light sources are white (i.e., having three saturated RGB color channels). Only the outer edge of each blurry point light source shows the correct color (i.e., red for the red light source, green for the green light source, and blue for the blue light source). A horizontal line 305 runs across the width of the image 300, bisecting the green and blue light sources in the bottom row of the triangle of light sources. Graph 310 represents a color profile (i.e., the light intensity of each color channel) on horizontal line 305 passing through the green and blue light sources. The x-axis in graph 310 represents the position in image 300 in the horizontal direction (i.e., the left side of graph 310 represents the left edge of image 300, and the right side of graph 310 represents the right edge of image 300), and the y-axis in graph 310 represents the intensity on the three color channels (i.e., the bottom edge of graph 310 represents the lowest color channel intensity values, and the top edge of graph 310 represents the highest color channel intensity values). The scale of graph 310 has been chosen such that the sensor saturation value is 1.0 (represented by dashed line 320). As can be seen, the light is much too bright to be imaged on the sensor without information loss (particularly in the green channel at the horizontal position corresponding to the green light source and in the blue channel at the horizontal position corresponding to the blue light source), and the values are clipped at a value of 1.0, as shown in graph 330, which is a 'zoomed in' view of graph 310, with the y-axis scaled to run only from 0.0 to 1.0.

Figure 3B:
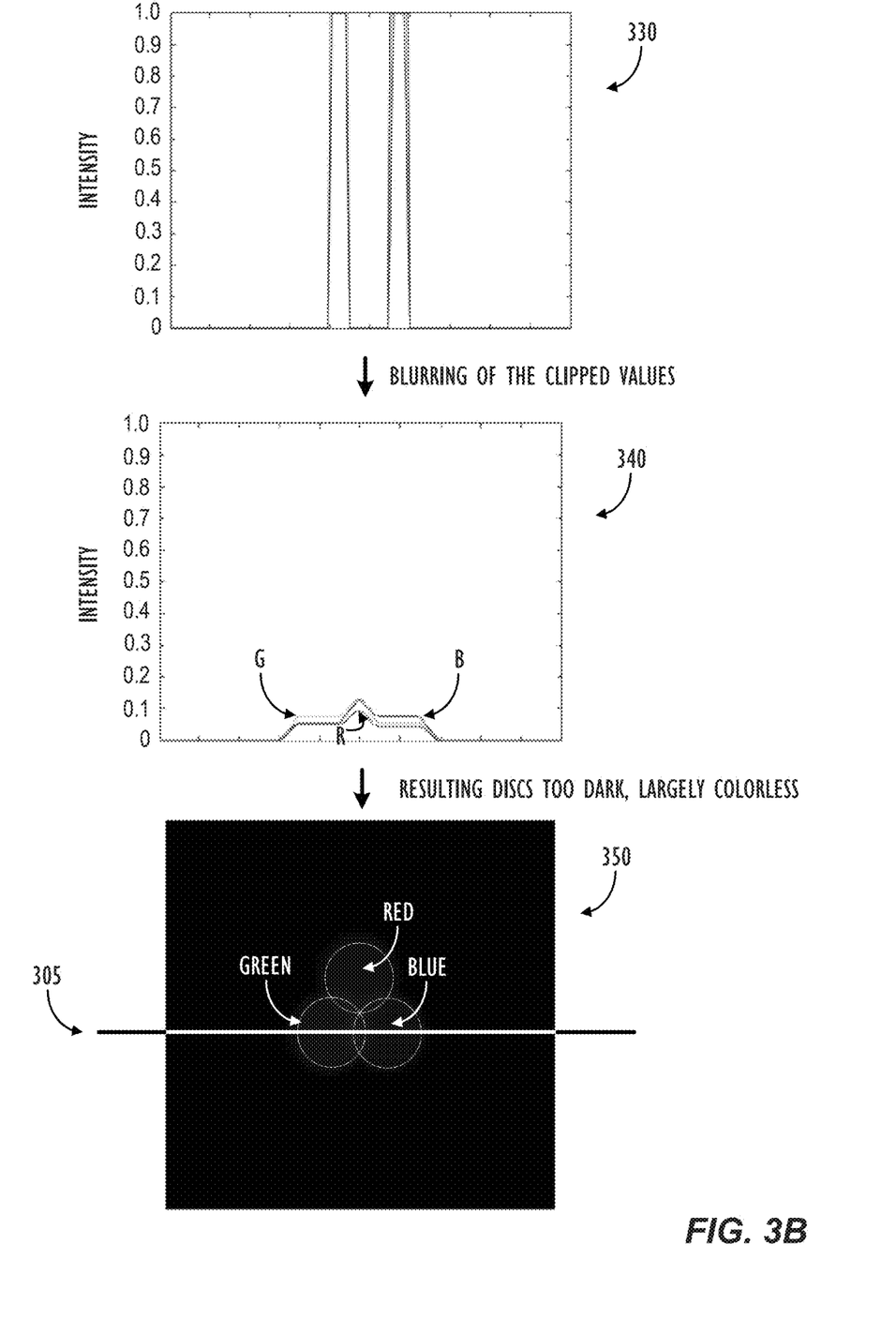
FIG. 3B illustrates blurred discs that have been created for three simulated light sources that have been clipped by an image sensor and the corresponding color channel profiles.

Turning now to FIG. 3B, blurred discs that have been created for three simulated light sources that have been clipped by an image sensor and the corresponding color channel profiles are illustrated. Graph 330 again shows the clipped RGB values first introduced in FIG. 3A. Graph 340 shows the RGB profiles on the same line 305 after blurring the clipped RGB values. With 1.0 being the saturation value, it is very clear that that blurred clipped spots are very dark (reaching no higher than 0.2 on the y-axis of graph 340 after blurring) and do not appear as bright colored discs in image 350. Even if the discs in image 350 were bright enough to be visible, it would be apparent that the colors of the individual discs was also lost, as it was on the clipped image 300.

Figure 4:
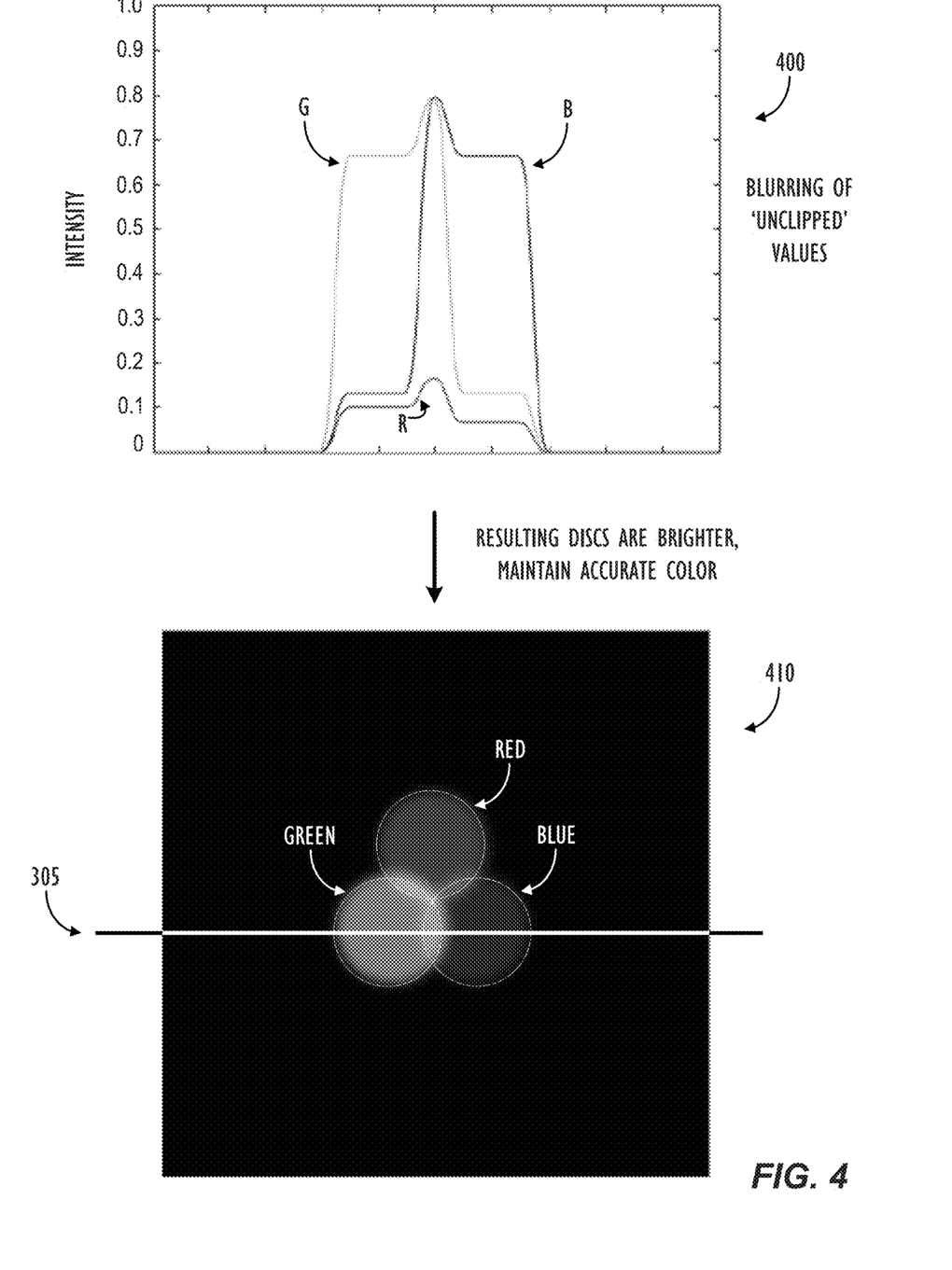
FIG. 4 illustrates blurred discs that have been created for three simulated light sources that have not been clipped by an image sensor (or reconstructed using HDR data) and the corresponding color channel profiles, according to one or more embodiments.

Turning now to FIG. 4, blurred discs that have been created for three simulated light sources that have not been clipped by an image sensor (or reconstructed using HDR data) and the corresponding color channel profiles are illustrated, according to one or more embodiments. As shown in graph 400, if the sensor never saturates (i.e., the values never exceed the saturation threshold of 1.0) and the color channels along line 305 are again blurred, the resulting values will be much larger than those shown in graph 340 of FIG. 3B, and the synthesized discs, as shown in image 410, will be much brighter and have the correct coloration that matches the actual color of the corresponding light source in the scene.

Figure 5A:
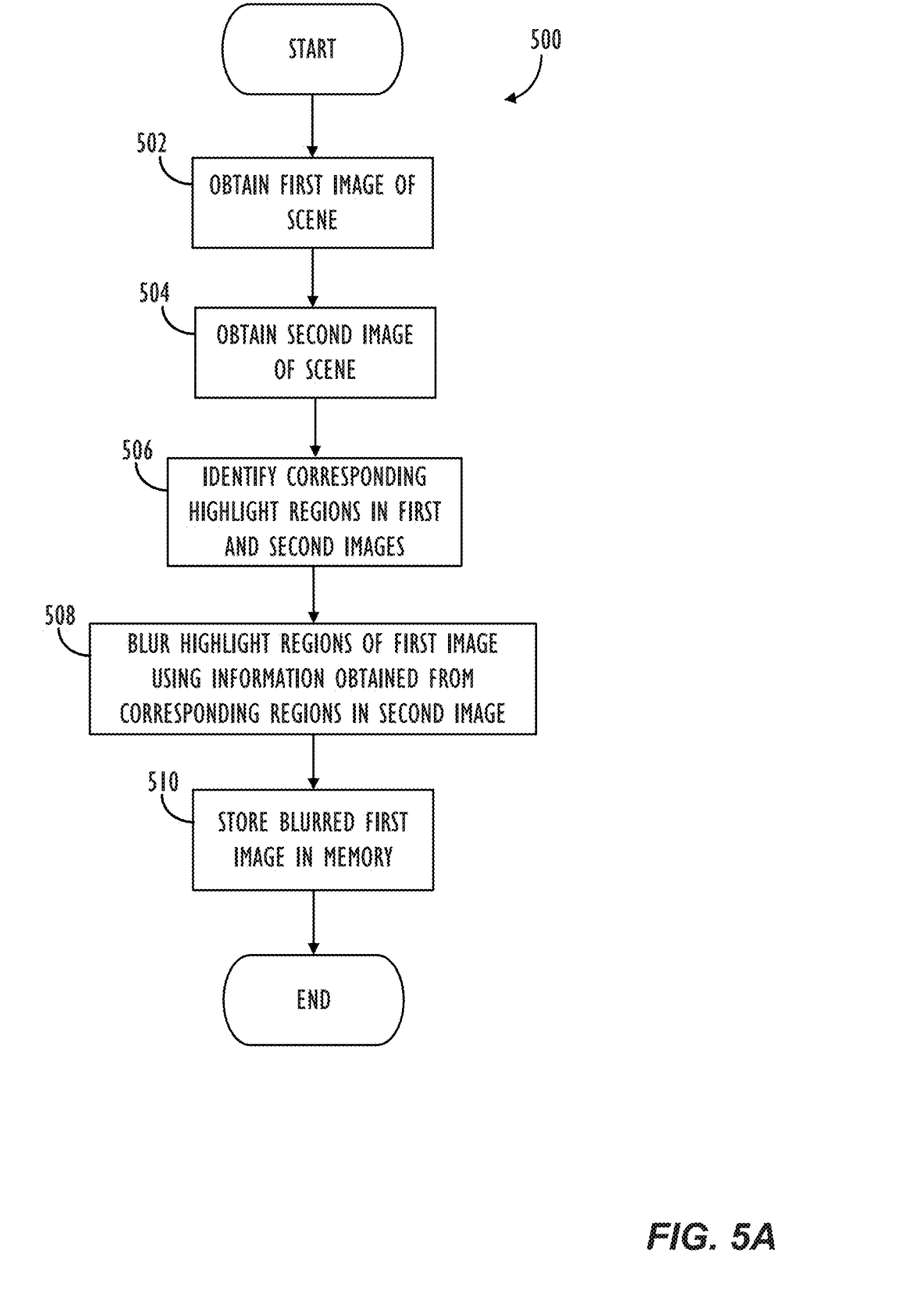
FIGS. 5A and 5B illustrate flowcharts of methods for synthesizing SDOF effects using two captured images of a scene, according to one or more embodiments.

Turning now to FIG. 5A, a flowchart 500 of a method for synthesizing SDOF effects using two captured images of a scene is illustrated, according to one or more embodiments. First, the process 500 starts by obtaining a first image of a scene (Step 502). Next, the process 500 obtains a second image of the scene (Step 504). As mentioned above, the first and second images may be taken of the scene at the same time (e.g., if the imaging device has two distinct cameras), or at different moments in time (e.g., one after the other). Preferably, the first and second images are taken as close together in time as possible, so that the scene captured in each of the first and second images is as similar as is possible, thus simplifying the merger process between the two images and the process of registering the two images (i.e., determining what portions of the first image correspond to what portions of the second image). As also mentioned above, the first and second images of the scene may be captured at different resolutions. For example, the first image may be taken at a "full" or "high" resolution (i.e., whatever pixel dimensions that may entail for a given implementation), and the second image may be taken at a much smaller, i.e., thumbnail, image resolution. Further, the first and second images of the scene may be taken using different integration times. For example, the first image may be taken with a longer integration time, allowing sufficient light energy to be captured by the image sensor and to increase the signal-to-noise ratio, and the second image may intentionally be taken with a shorter integration time, so as to avoid pixel saturation (also referred to herein as "clipping" or "blowouts"), i.e., pixels that are rendered as pure white because each of the color channels has captured greater than the maximum allowable about of light energy on the senor during the image capture, and to capture and distinguish true scene colors more accurately.

At Step 506, the process may identify corresponding highlight regions in the first and second images. This step may, e.g., entail scaling either the first image or second image (or both) to be at the same (or comparable) resolutions as one another, so that a comparison of corresponding portions of the scene may be made more readily. As mentioned above, if one image is taken with a longer integration time than the other image, the image taken with the longer integration time may be used to identify highlight regions in the scene, e.g., those regions where more than a threshold number of pixels within a particular portion of the scene are saturated (or within a threshold value of saturation). Once the highlight regions in the scene are identified, the corresponding portions of the scene may be identified in the other (i.e., lower integration time) image, which may be used to provide more accurate color information for those portions of the scene, rather than simply pure white, i.e., saturated pixel color values.

At Step 508, the color information obtained from the corresponding highlight regions of the second, i.e., shorter integration, image may be used to effectively synthesize SDOF effects in the background highlight regions of the first, i.e., longer integration, image. For example, as described above, once the background portions of the scene have been identified, a blurring operation may be applied to the background portions of the first image. Then, the highlight regions identified in the background of the first image may be replaced by synthesized bokeh discs, e.g., having a disc color informed by the color of the corresponding region in the second, i.e., shorter integration, image and a size (e.g., diameter, in the case of a circular disc being synthesized) that is informed by the measured or estimated depth of the particular portion of the scene where the background highlight region was identified as being located. As also described above with reference to FIGS. 2B and 2C, the synthesized SDOF effects (e.g., blurring and disc creation for background highlight regions) may either be performed in the second image and then upscaled and 'ported' over to replace the first image's background, or the synthesized SDOF effects may be made directly to the background portions of the first image, i.e., using the additional color (and brightness) information gleaned from the second image to inform the color, brightness, size, position, etc., of the SDOF effects being synthesized. Finally, the blurred first image (i.e., with the synthesized SDOF effects applied to it in 'real time') may be stored in a memory (Step 510). In some embodiments, the storage may be to temporary memory, e.g., so that the synthesized SDOF image may be displayed on a live video stream on a device, or the storage may be to more permanent memory, e.g., in the event that the user of the imaging device wants to store and keep a copy of the synthesized SDOF image (or synthesized SDOF video clip).

Figure 5B:
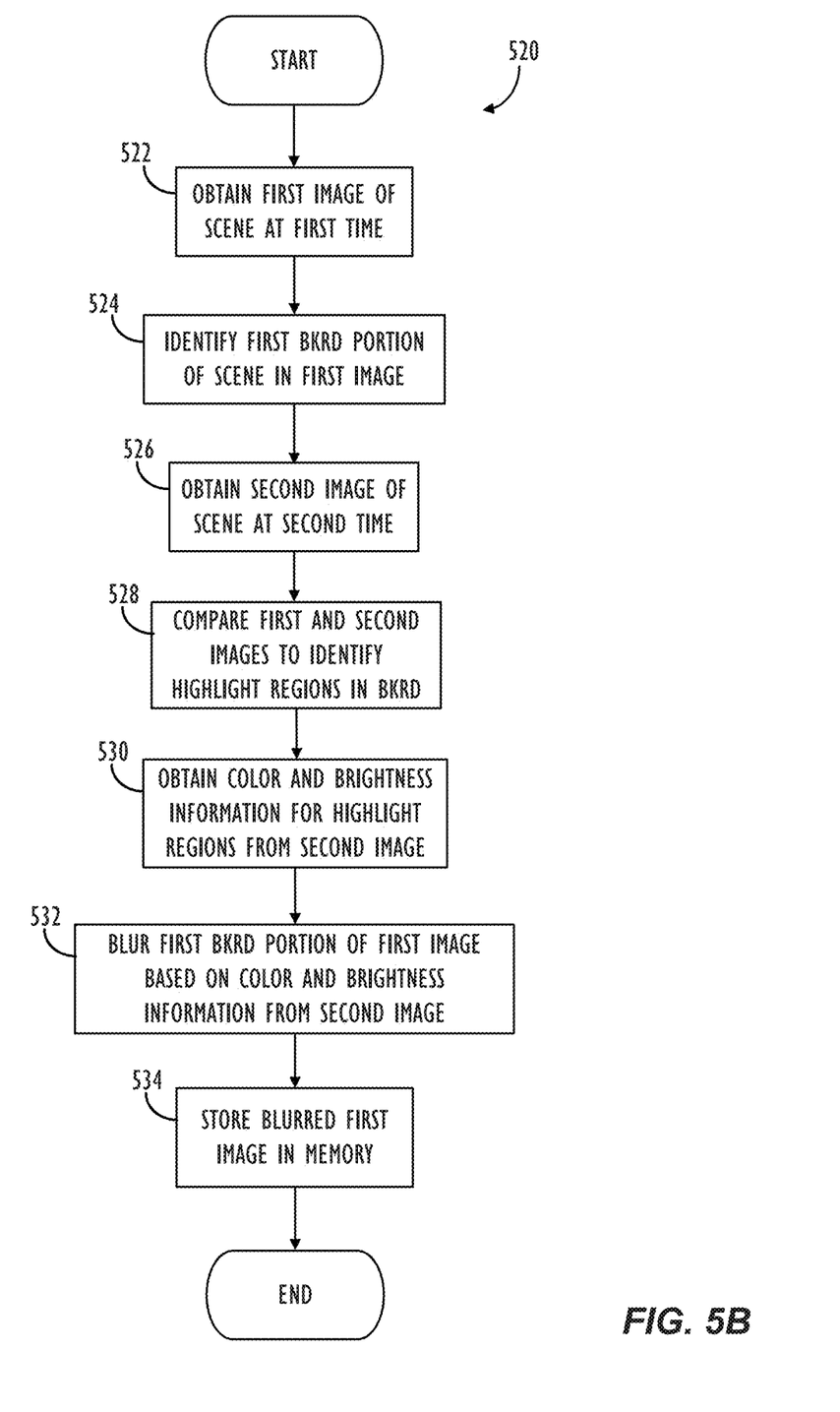

Turning now to FIG. 5B, a flowchart 520 of another method for synthesizing SDOF effects using two captured images of a scene is illustrated, according to one or more embodiments. As with method 500 of FIG. 5A, the process 520 may begin at Step 522 by obtaining a first image of a scene at a first time. Next, at Step 524, the process may identify a first background portion of the scene captured in the first image. The process may then, at Step 526, obtain a second image of the scene at a second time. After adjusting for differences in scale and/or resolution (if so desired), the process 520 may compare the first and the second images to identify highlight regions in the background of the scene (Step 528). Operating on only the background portions of the scene may save processing resources, since it is usually not desirable to apply synthesized SDOF effects to the foreground regions of an image.

Turning to Step 530, more accurate color and brightness information may be obtained for the highlight regions of the scene from the second image. For example, in some embodiments, the integration time of the second image may be controlled in such a fashion that brightness values from the second image may be used to estimate the 'true' brightness values of portions of the scene that were saturated in the first, i.e., longer integration, image. For example, if the 'under-exposed' second image is captured at 5 f-stops down from the first image, the second image would be expected to be 32 times darker than original image, i.e., $1/(2^5)$, or $\frac{1}{32}$, of the average brightness of the normally-exposed first image. Thus, the brightness values of the second image could be multiplied by 32 to recover the expected 'true' brightness values of the 'normally-exposed' first image. Moreover, as explained above, the 'true' color values of the highlight regions may also be obtained from the 'under-exposed' second image, since the pixels in the highlight regions of the second image will not be fully saturated. The expected 'true' brightness and 'true' color values for the saturated highlight regions in the first image obtained in Step 530 may then be used in Step 532, wherein the background portion of the first image is blurred based on the 'true' brightness and 'true' color values obtained from the second image to produce synthetic SDOF effects in a modified version of the first image. For example, as described above, the synthetic SDOF effects may comprise blurring in the background portion of the scene and bokeh disc creation (of appropriate size, color, brightness, etc.) for background highlight regions. Finally, the blurred first image (i.e., with the synthesized SDOF effects applied to it in 'real time') may be stored in a memory (Step 534). In some embodiments, the storage may be to temporary memory, e.g., so that the synthesized SDOF image may be displayed on a live video stream on a device, or the storage may be to more permanent memory, e.g., in the event that the user of the imaging device wants to store and keep a copy of the synthesized SDOF image (or synthesized SDOF video clip).

Figure 6:
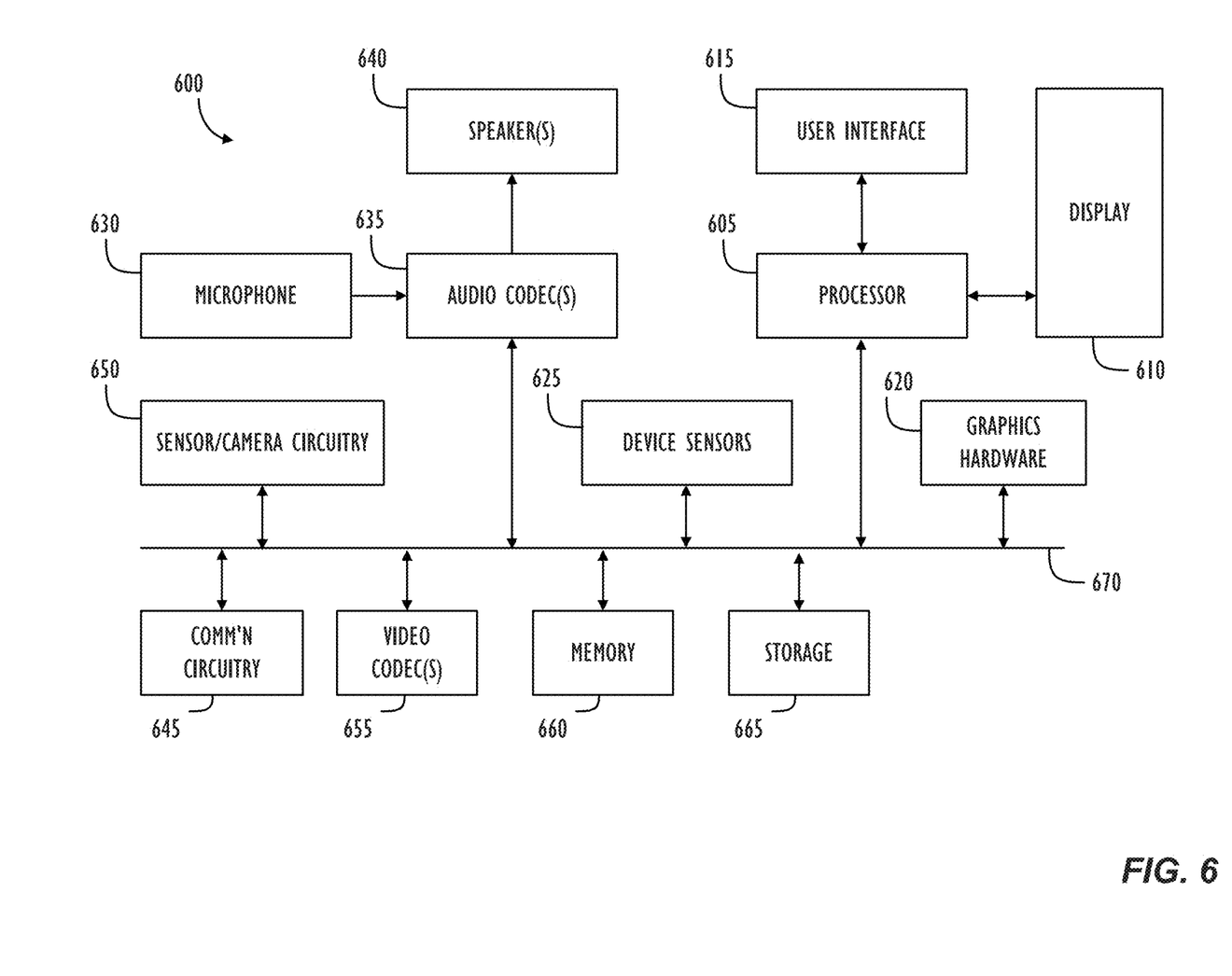
FIG. 6 is a block diagram illustrating a programmable imaging device in which one or more of the techniques disclosed herein may be implemented.

Turning now to FIG. 6, a simplified functional block diagram of illustrative device 600 is shown, according to one or more embodiments. Device 600 could be, for example, a mobile telephone, personal media device, portable camera, or a tablet, notebook or desktop computer system. As shown, device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, sensor/camera circuitry 650, which may, e.g., comprise single or multiple camera units/optical sensors having different characteristics, video codec(s) 655, memory 660, storage 665, and communications bus 670.

Processor 605 may execute instructions necessary to carry out or control the operation of many functions performed by device 600 (e.g., such as the generation and/or processing of images in accordance with the various embodiments described herein). Processor 605 may, for instance, drive display 610 and receive user input from user interface 615. User interface 615 can take a variety of forms, such as a button, keypad, dial, a click wheel, keyboard, display screen and/or a touch screen. User interface 615 could, for example, be the conduit through which a user may view a captured video stream and/or indicate particular frame(s) that the user would like to have a particular SDOF effect applied to (e.g., by clicking on a physical or virtual button at the moment the desired frame is being displayed on the device's display screen). In one embodiment, display 610 may display a video stream as it is imaged. In another embodiment, processor 605 and/or graphics hardware 620 and/or image capture circuitry may contemporaneously generate and/or display a synthetic SDOF version of the imaged video stream, which synthetic SDOF video stream may also be stored in memory 660 and/or storage 665. Processor 605 may be a system-on-chip such as those found in mobile devices and include one or more dedicated graphics processing units (GPUs). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 perform computational tasks. In one embodiment, graphics hardware 620 may include one or more programmable graphics processing units (GPUs).

Sensor/camera circuitry 650 may comprise one or more camera units configured to capture images, e.g., at different zoom levels or at different resolutions, which may be processed to generate a single synthetic SDOF merged image for each desired 'instance' of the scene (e.g., 15 fps, 30 fps, etc.), in accordance with this disclosure. Output from sensor/camera circuitry 650 may be processed, at least in part, by video codec(s) 655 and/or processor 605 and/or graphics hardware 620, and/or a dedicated image processing unit incorporated within sensor/camera circuitry 650. Images so captured may be stored in memory 660 and/or storage 665. Memory 660 may include one or more different types of media used by processor 605, graphics hardware 620, and sensor/camera circuitry 650 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to retain computer program instructions or code organized into one or more modules and written in any desired computer programming language. When executed by, for example, processor 605 such computer program code may implement one or more of the methods described herein.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory program storage device comprising instructions stored thereon to cause one or more processors to:
    obtain a first image of a scene;
    obtain a second image of the scene;
    identify a highlight region in the first image, the highlight region having a corresponding region in the second image;
    modify the first image by applying a blur to the highlight region of the first image to create an artificial shallow depth of field (SDOF) effect in the first image, wherein one or more characteristics of the blur is determined using information obtained from the corresponding region in the second image; and
    store the modified first image in a memory.

2. The non-transitory program storage device of claim 1, wherein the obtained second image of the scene has a lower resolution than the first image of the scene.

3. The non-transitory program storage device of claim 1, wherein the instructions to identify a highlight region in the first image further comprise instructions to:
    obtain a downscaled version of the first image, wherein the downscaled version of the first image has the same resolution as the second image; and
    compare the downscaled version of the first image to the second image.

4. The non-transitory program storage device of claim 1, wherein the obtained second image of the scene is captured with a shorter integration time than the first image of the scene.

5. The non-transitory program storage device of claim 1, wherein the first image and the second image represent the scene at the same moment in time.

6. The non-transitory program storage device of claim 1, wherein the instructions to apply a blur further comprise instructions to:
    create a disc for the highlight region of the first image, wherein at least one of: a color characteristic of the disc and a brightness characteristic of the disc are based, at least in part, on the information obtained from the corresponding region in the second image.

7. An imaging device, comprising:
    an imaging system;
    a programmable control device; and
    a memory coupled to the programmable control device, wherein instructions are stored in the memory, the instructions, when executed, causing the programmable control device to:
        obtain a first image of a scene;
        obtain a second image of the scene;
        identify a highlight region in the first image, the highlight region having a corresponding region in the second image;
        modify the first image by applying a blur to the highlight region of the first image to create an artificial SDOF effect in the first image, wherein one or more characteristics of the blur is determined using information obtained from the corresponding region in the second image; and
        store the modified first image in the memory.

8. The imaging device of claim 7, wherein the obtained second image of the scene has a lower resolution than the first image of the scene.

9. The imaging device of claim 7, wherein the instructions to identify a highlight region in the first image further comprise instructions to:
    obtain a downscaled version of the first image, wherein the downscaled version of the first image has the same resolution as the second image; and
    compare the downscaled version of the first image to the second image.

10. The imaging device of claim 7, wherein the obtained second image of the scene is captured with a shorter integration time than the first image of the scene.

11. The imaging device of claim 7, wherein the first image and the second image represent the scene at the same moment in time.

12. The imaging device of claim 7, wherein the instructions to apply a blur further comprise instructions to:
    create a disc for the highlight region of the first image, wherein at least one of: a color characteristic of the disc and a brightness characteristic of the disc are based, at least in part, on the information obtained from the corresponding region in the second image.

13. An image processing method, comprising:
    obtaining a first image of a scene;
    obtaining a second image of the scene;
    identifying a highlight region in the first image, the highlight region having a corresponding region in the second image;
    modifying the first image by applying a blur to the highlight region of the first image to create an artificial SDOF effect in the first image, wherein one or more characteristics of the blur is determined using information obtained from the corresponding region in the second image; and
    storing the modified first image in a memory.

14. The method of claim 13, wherein the obtained second image of the scene has a lower resolution than the first image of the scene.

15. The method of claim 13, wherein identifying a highlight region in the first image further comprises:
    obtaining a downscaled version of the first image, wherein the downscaled version of the first image has the same resolution as the second image; and
    comparing the downscaled version of the first image to the second image.

16. The method of claim 13, wherein the obtained second image of the scene is captured with a shorter integration time than the first image of the scene.

17. The method of claim 13, wherein applying a blur further comprises:
    creating a disc for the highlight region of the first image, wherein at least one of: a color characteristic of the disc and a brightness characteristic of the disc are based, at least in part, on the information obtained from the corresponding region in the second image.

* * * * *